US011786831B2

United States Patent
Atsumi et al.

(10) Patent No.: US 11,786,831 B2
(45) Date of Patent: Oct. 17, 2023

(54) ROBOT

(71) Applicant: CASIO COMPUTER CO., LTD., Tokyo (JP)

(72) Inventors: Hiroki Atsumi, Tachikawa (JP); Miyuki Urano, Akiruno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 442 days.

(21) Appl. No.: 17/084,362

(22) Filed: Oct. 29, 2020

(65) Prior Publication Data
US 2021/0129035 A1    May 6, 2021

(30) Foreign Application Priority Data
Oct. 31, 2019    (JP) .................. 2019-198945

(51) Int. Cl.
*A63H 3/00*    (2006.01)
*A63H 13/00*    (2006.01)
*A63H 29/24*    (2006.01)
*A63H 3/28*    (2006.01)
*G06N 3/008*    (2023.01)

(52) U.S. Cl.
CPC .......... *A63H 3/003* (2013.01); *A63H 13/005* (2013.01); *A63H 29/24* (2013.01); *A63H 3/28* (2013.01); *A63H 2200/00* (2013.01); *G05B 2219/39001* (2013.01); *G06N 3/008* (2013.01)

(58) Field of Classification Search
CPC ...... A63H 3/003; A63H 13/005; A63H 29/24; A63H 3/28; A63H 2200/00; A63H 29/22; A63H 11/00; G05B 2219/39001; G06N 3/008
See application file for complete search history.

(56) References Cited

U.S. PATENT DOCUMENTS

| | | | | |
|---|---|---|---|---|
| 6,362,589 B1 * | 3/2002 | Inoue | ................... | G05D 1/0088 318/568.1 |
| 6,458,011 B1 * | 10/2002 | Inoue | ...................... | A63H 3/36 446/376 |
| 6,529,802 B1 * | 3/2003 | Kawakita | ............... | B25J 19/021 709/219 |
| 6,697,711 B2 | 2/2004 | Yokono et al. | | |
| 2003/0074107 A1 * | 4/2003 | Noma | .................... | G06N 3/126 700/245 |

FOREIGN PATENT DOCUMENTS

JP    2002239960 A    8/2002

* cited by examiner

*Primary Examiner* — Kira Nguyen
(74) *Attorney, Agent, or Firm* — Holtz, Holtz & Volek PC

(57) ABSTRACT

A robot includes a body contactable with a placement surface, a head, at least one actuator, and at least one processor. The head is contactable with the placement surface, and is coupled to a front end of the body so as to be rotatable about a first rotational axis extending in a front-rear direction of the body and rotatable about a second rotational axis extending in a width direction of the body. The at least one actuator turns the head by causing the head to make a turn about the first rotational axis and a turn about the second rotational axis independently of each other. The at least one processor repeats a first turn control scheme and a second turn control scheme in sequence.

9 Claims, 16 Drawing Sheets

FIG. 9

| EXTERNAL STIMULATION | REACTION |
|---|---|
| NONE | RESPIRE |
| DETECTION OF LOUD SOUND AT MICROPHONE | GET SURPRISED |
| DETECTION OF BEING TAPPED AT TOUCH SENSOR OF BODY | GET PLEASED |
| DETECTION OF BEING HELD AT ACCELERATION SENSOR AND TOUCH SENSORS | GET EXCITED |
| DETECTION OF BEING SLAPPED AT TOUCH SENSOR OF HEAD | GET ANGRY |
| DETECTION OF BEING THROWN AT ACCELERATION SENSOR AND TOUCH SENSORS | GET NERVOUS |
| DETECTION OF BEING SLAPPED AT TOUCH SENSOR OF BODY | GET SAD |
| DETECTION OF BEING SUSPENDED UPSIDE DOWN IN AIR AT ACCELERATION SENSOR AND TOUCH SENSORS | GET DISPIRITED |
| DETECTION OF SMALL SOUND AT MICROPHONE | GET CALM |
| DETECTION OF BEING TAPPED AT TOUCH SENSOR OF HEAD | GET RELAXED |
| DETECTION OF VOICE "RIGHT" AT MICROPHONE | MAKE 90° RIGHT TURN |
| DETECTION OF VOICE "RIGHT-ABOUT-FACE" AT MICROPHONE | MAKE 180° RIGHT TURN |
| DETECTION OF VOICE "LEFT" AT MICROPHONE | MAKE 90° LEFT TURN |
| DETECTION OF VOICE "LEFT-ABOUT-FACE" AT MICROPHONE | MAKE 180° LEFT TURN |
| NOTIFICATION OF TOP OF EVERY HOUR FROM CLOCK | ANNOUNCE TIME |
| ⋮ | ⋮ |

FIG. 10

| REACTION | BEHAVIOR |
|---|---|
| RESPIRE | 0:0:0<br>3000:-20:0<br>6000:-60:0<br>9000:-20:0<br>12000:-60:0<br>15000:-20:0<br>18000:-60:0<br>21000:-20:0<br>24000:-60:0 |
| GET SURPRISED | 0:0:0<br>100:80:0 |
| GET PLEASED | 0:0:0<br>500:80:0<br>1000:80:80<br>1500:80:-80<br>2000:80:80<br>2500:80:-80<br>3000:80:80<br>3500:80:-80<br>4000:80:80<br>4500:80:-80 |
| GET EXCITED | 0:0:0<br>600:100:0<br>800:100:40<br>1000:100:-40<br>1200:100:40<br>1400:100:-40<br>1600:100:40<br>1800:100:-40<br>2000:100:40<br>2200:100:40 |
| ⋮ | ⋮ |

| REACTION | BEHAVIOR |
|---|---|
| ⋮ | ⋮ |
| GET ANGRY | 0:0:0<br>600:80:0<br>800:80:40<br>1000:80:-40<br>1200:100:0<br>1400:60:0<br>1600:80:40<br>1800:80:-40<br>2000:100:0<br>2200:60:0 |
| GET NERVOUS | 0:0:0<br>500:-50:0<br>1000:-50:80<br>1500:-50:-80<br>2000:-50:80<br>2500:-50:-80<br>3000:-50:80<br>3500:-50:-80<br>4000:-50:80<br>4500:-50:-80 |
| GET SAD | 0:0:0<br>600:-100:0<br>900:-80:0<br>1200:-100:0<br>1500:-80:0<br>1800:-100:0<br>2100:-80:0<br>2400:-100:0<br>2700:-80:0<br>3000:-100:0 |
| GET DISPIRITED | 0:0:0<br>1000:-50:0<br>2000:-50:80<br>4000:-50:-80<br>6000:-50:80<br>8000:-50:-80<br>10000:-50:80<br>12000:-50:-80 |
| ⋮ | ⋮ |

| REACTION | BEHAVIOR |
|---|---|
| ⋮ | ⋮ |
| GET CALM | 0:0:0<br>2000:−30:0<br>4000:0:0<br>6000:−30:0<br>8000:0:0<br>10000:−30:0<br>12000:0:0<br>14000:−30:0 |
| GET RELAXED | 0:0:0<br>3000:30:0<br>6000:0:0<br>9000:30:0<br>12000:0:0<br>15000:30:0<br>18000:0:0<br>21000:30:0 |
| MAKE RIGHT TURN | 0:0:0<br>500:50:100<br>1000:−100:100<br>2000:−100:−100<br>2500:50:100<br>3000:−100:100<br>4000:−100:−100<br>4500:50:100<br>5000:−100:100<br>6000:−100:−100 |
| ⋮ | ⋮ |

| REACTION | BEHAVIOR |
|---|---|
| ⋮ | ⋮ |
| MAKE LARGE RIGHT TURN | 0:0:0<br>500:50:100<br>1000:-100:100<br>2000:-100:-100<br>2500:50:100<br>3000:-100:100<br>4000:-100:-100<br>4500:50:100<br>5000:-100:100<br>6000:-100:-100<br>6500:50:100<br>7000:-100:100<br>8000:-100:-100<br>8500:50:100<br>9000:-100:100<br>10000:-100:-100<br>10500:50:100<br>1100:-100:100<br>12000:-100:-100 |
| MAKE LEFT TURN | 0:0:0<br>500:50:-100<br>1000:-100:100<br>2000:-100:100<br>2500:50:-100<br>3000:-100:-100<br>4000:-100:100<br>4500:50:-100<br>5000:-100:-100<br>6000:-100:100 |
| ⋮ | ⋮ |

| REACTION | BEHAVIOR |
|---|---|
| ⋮ | ⋮ |
| MAKE LARGE LEFT TURN | 0:0:0<br>500:50:-100<br>1000:-100:-100<br>2000:-100:100<br>2500:50:-100<br>3000:-100:-100<br>4000:-100:100<br>4500:50:-100<br>5000:-100:-100<br>6000:-100:100<br>6500:50:-100<br>7000:-100:-100<br>8000:-100:100<br>8500:50:-100<br>9000:-100:-100<br>10000:-100:100<br>10500:50:-100<br>11000:-100:-100<br>12000:-100:100 |
| ANNOUNCE TIME | 0:0:0<br>500:80:0<br>1000:80:80<br>1500:80:-80 |
| ⋮ | ⋮ |

| REACTION | SOUND |
|---|---|
| RESPIRE | NONE |
| GET SURPRISED | SOUND INDICATING "GET SURPRISED" |
| GET PLEASED | SOUND INDICATING "GET PLEASED" |
| GET EXCITED | SOUND INDICATING "GET EXCITED" |
| GET ANGRY | SOUND INDICATING "GET ANGRY" |
| GET NERVOUS | SOUND INDICATING "GET NERVOUS" |
| GET SAD | SOUND INDICATING "GET SAD" |
| GET DISPIRITED | SOUND INDICATING "GET DISPIRITED" |
| GET CALM | SOUND INDICATING "GET CALM" |
| GET RELAXED | SOUND INDICATING "GET RELAXED" |
| MAKE 90° RIGHT TURN | NONE |
| MAKE 180° RIGHT TURN | NONE |
| MAKE 90° LEFT TURN | NONE |
| MAKE 180° LEFT TURN | NONE |
| ANNOUNCE TIME | SOUND FOR ANNOUNCING TIME |
| ⋮ | ⋮ |

123

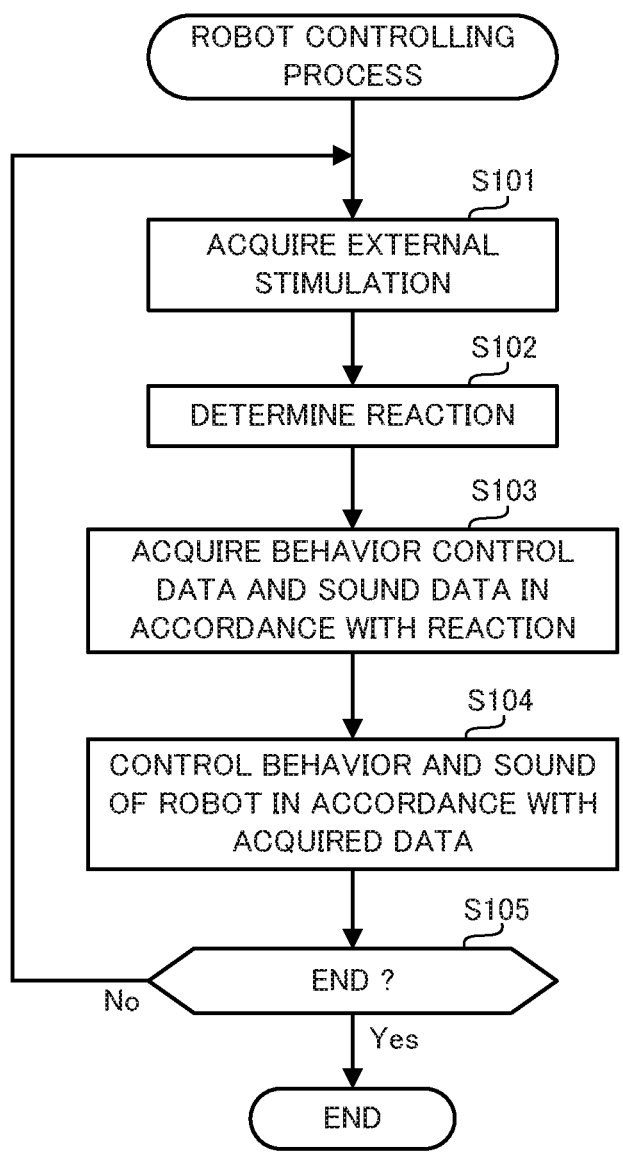

ROBOT

CROSS-REFERENCE TO RELATED APPLICATION

This application claims the benefit of Japanese Patent Application No. 2019-198945, filed on Oct. 31, 2019, the entire disclosure of which is incorporated by reference herein.

FIELD

This application relates to a robot.

BACKGROUND

One of the known existing robots is disclosed in Unexamined Japanese Patent Application Publication No. 2002-239960, for example. The disclosed robot has a dog-like shape having a body, a head, and four legs. The robot moves the head and the legs relative to the body and can thereby represent various animalistic behaviors.

SUMMARY

A robot includes a body contactable a placement surface, a head, at least one actuator, and at least one processor. The head is contactable with the placement surface, and is coupled to a front end of the body so as to be rotatable about a first rotational axis extending in a front-rear direction of the body and rotatable about a second rotational axis extending in a width direction of the body. The at least one actuator turns the head by causing the head to make a turn about the first rotational axis and a turn about the second rotational axis independently of each other. The at least one processor repeats a first turn control scheme and a second turn control scheme in sequence, the first turn control scheme involving driving the actuator to cause the head to make a turn about the first rotational axis in a state in which the head is in contact with the placement surface, the second turn control scheme involving driving the actuator to cause the head to leave the placement surface and return to an original rotational angle before making the turn in the first turn control scheme.

BRIEF DESCRIPTION OF THE DRAWINGS

A more complete understanding of this application can be obtained when the following detailed description is considered in conjunction with the following drawings, in which:

FIG. 9 is a diagram for describing an exemplary reaction table according to Embodiment 1;

FIG. 10 is a first diagram for describing an exemplary behavior table according to Embodiment 1;

FIG. 11 is a second diagram for describing the exemplary behavior table according to Embodiment 1;

FIG. 12 is a third diagram for describing the exemplary behavior table according to Embodiment 1;

FIG. 13 is a fourth diagram for describing the exemplary behavior table according to Embodiment 1;

FIG. 14 is a fifth diagram for describing the exemplary behavior table according to Embodiment 1;

FIG. 15 is a diagram for describing an exemplary sound table according to Embodiment 1;

FIG. 16 is a flowchart illustrating a robot controlling process according to Embodiment 1;

DETAILED DESCRIPTION

Embodiments of the disclosure will now be described with reference to the accompanying drawings. The components identical or corresponding to each other are provided with the same reference symbol.

Embodiment 1

Figure 1:
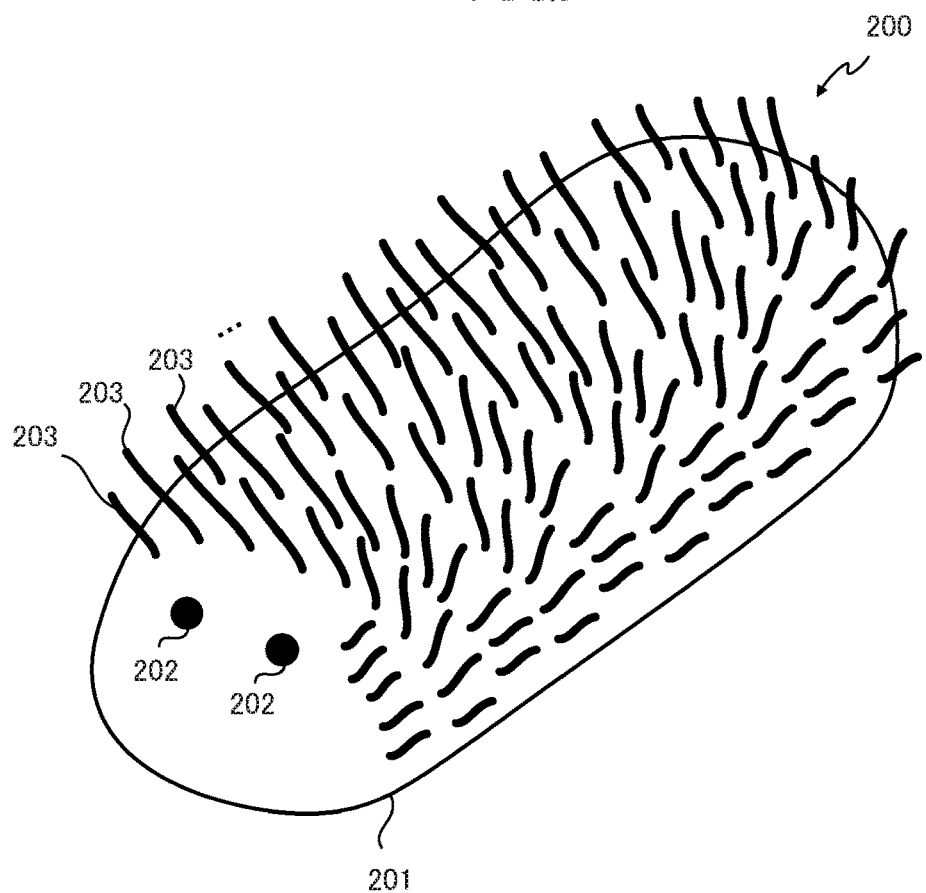
FIG. 1 illustrates the appearance of a robot according to Embodiment 1.
Figure 2:
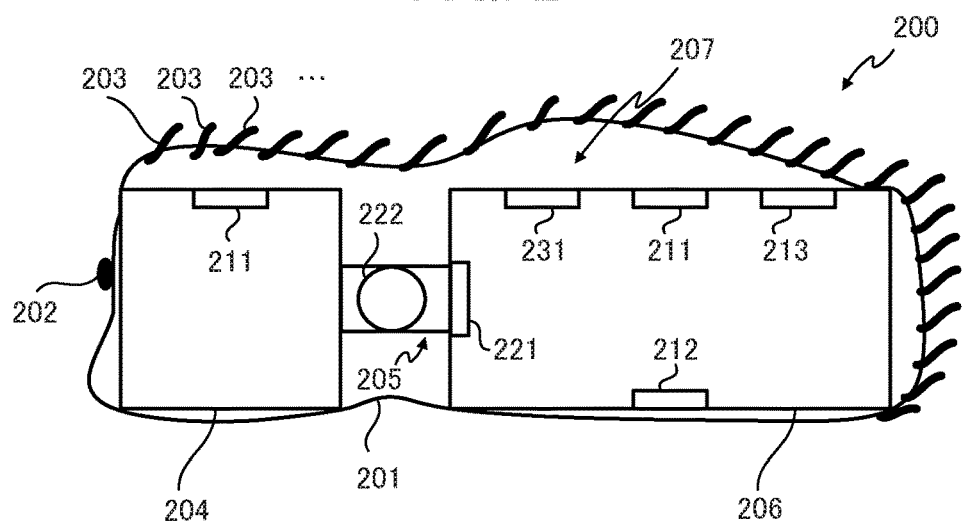
FIG. 2 is a sectional view of the robot according to Embodiment 1 as viewed from the side.

A robot 200 according to an embodiment of the disclosure is a pet robot in the similitude of a small animal With reference to FIG. 1, the robot 200 is covered with an outer cover 201 having decorative parts 202 in the similitude of eyes and abundant hairs 203. The outer cover 201 accommodates a housing 207 of the robot 200. With reference to FIG. 2, the housing 207 of the robot 200 includes a head 204, a joint 205, and a body 206. The head 204 is coupled to the body 206 via the joint 205.

The outer cover 201 is mounted over the housing 207 with snap fasteners so that the outer cover 201 moves in accordance with a movement of the housing 207 of the robot 200. Specifically, the head 204 has two snap fasteners in the front portion and the body 206 has two snap fasteners in the rear portion. The outer cover 201 also has snap fasteners at the corresponding positions to fit with the snap fasteners of the head 204 and the body 206. These snap fasteners fix the outer cover 201 over the housing 207. The illustrated number and positions of the snap fasteners are a mere example and may be arbitrarily modified.

The body 206 extends in the front-rear direction and is contactable, via the outer cover 201, with a placement surface (for example, floor or table) on which the robot 200 is placed. As illustrated in FIG. 2, the body 206 is equipped with a roll motor 221 at the front end. The front end of the body 206 is coupled to the head 204 via the joint 205. The joint 205 is equipped with a pitch motor 222. The roll motor 221 is included in the body 206 in FIG. 2 but may alternatively be included in the joint 205.

Figure 3:
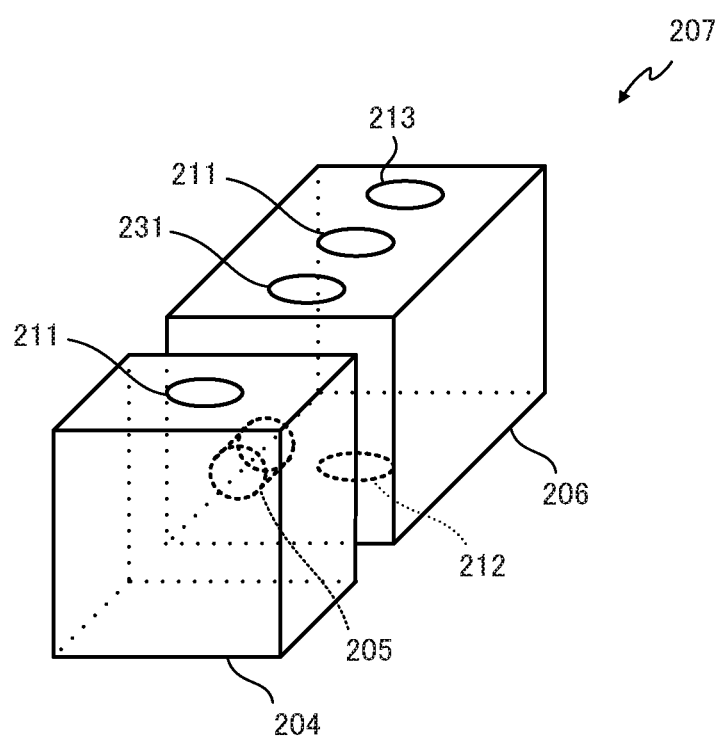
FIG. 3 is a diagram for describing a housing of the robot according to Embodiment 1.
Figure 4:
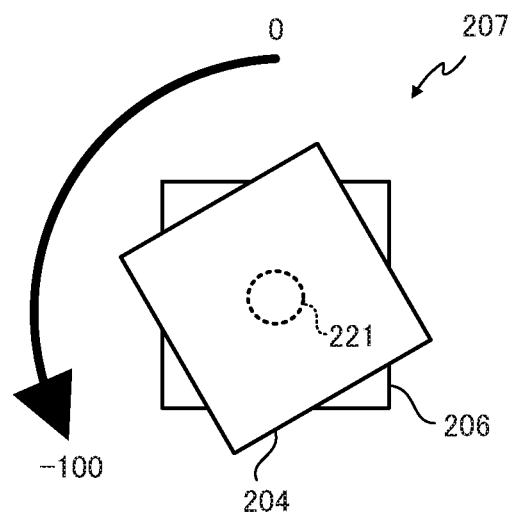
FIG. 4 is a diagram for explaining an exemplary movement of a roll motor of the robot according to Embodiment 1.
Figure 5:
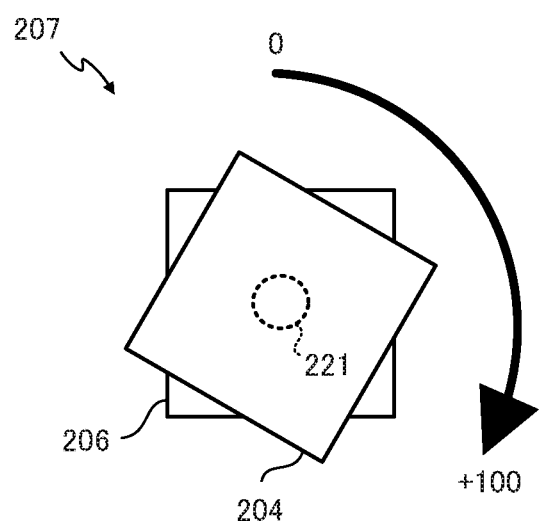
FIG. 5 is another diagram for explaining an exemplary movement of the roll motor of the robot according to Embodiment 1.

The joint 205 couples the body 206 to the head 204 so as to be rotatable about a first rotational axis, which extends through the joint 205 in the front-rear direction of the body 206. With reference to the front view of the housing 207 in FIG. 4 or 5, the roll motor 221 drives the head 204 to turn about the first rotational axis in a clockwise (right-hand) direction (that is, make a normal turn) relative to the body 206 within a normal-turn angle range, or turn in a counter-clockwise (left-hand) direction (that is, make a reverse turn) within a reverse-turn angle range. The clockwise direction in this description means the clockwise direction when viewed from the body 206 toward the head 204. The turn in the clockwise direction will be also referred to as "right-hand twist" and the turn in the counterclockwise direction will be also referred to as "left-hand twist". The angle of the right-hand or left-hand twist has any limit. In FIGS. 4 and 5, the angle of 0 (hereinafter referred to as "reference roll angle") of the head 204 indicates the state in which the head 204 does not twist in the right-hand or left-hand direction as illustrated in FIG. 3. The angle of −100 indicates the right limit of the right-hand twist (clockwise turn) and the angle of +100 indicates the left limit of the left-hand twist (counterclockwise turn).

Figure 6:
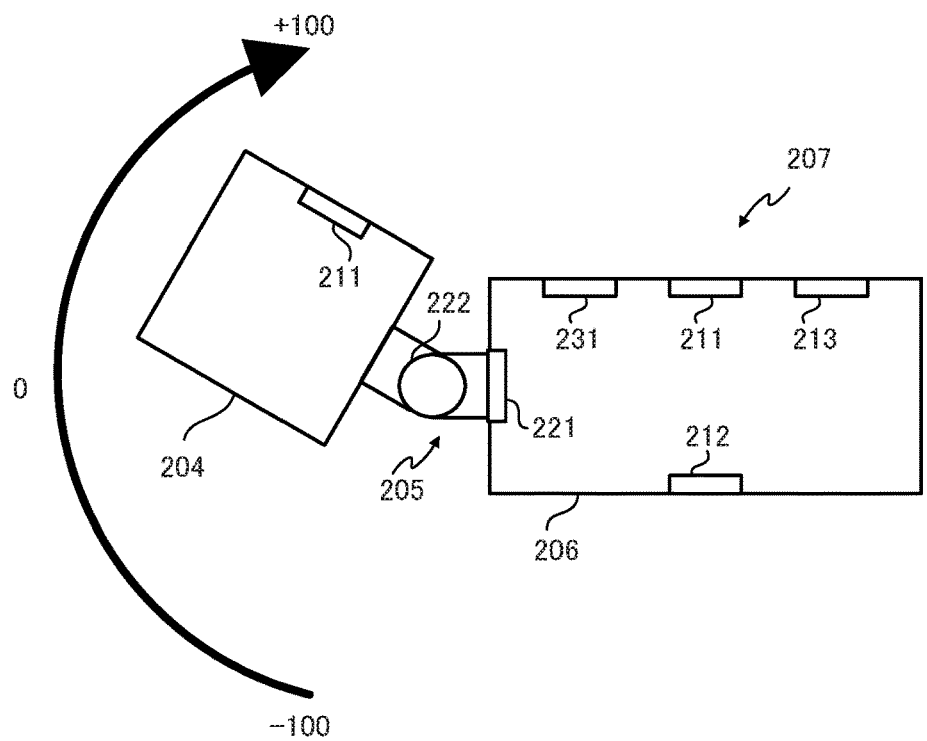
FIG. 6 is a diagram for explaining an exemplary movement of a pitch motor of the robot according to Embodiment 1.
Figure 7:
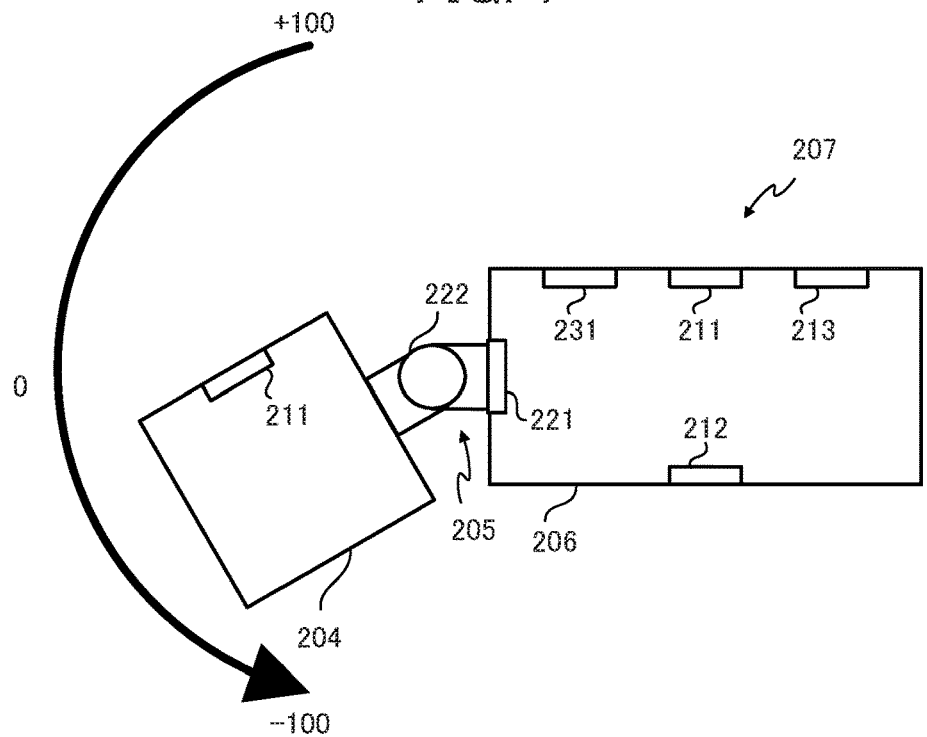
FIG. 7 is another diagram for explaining an exemplary movement of the pitch motor of the robot according to Embodiment 1.

The joint 205 couples the body 206 to the head 204 so as to be rotatable also about a second rotational axis, which extends through the joint 205 in the width direction of the body 206. With reference to the side view of the housing 207 in FIG. 6 or 7, the pitch motor 222 drives the head 204 to turn about the second rotational axis upward (that is, make a normal turn) within a normal-turn angle range, or turn downward (that is, make a reverse turn) within a reverse-turn angle range. The angle of the upward or downward turn has any limit. In FIGS. 6 and 7, the angle of 0 (hereinafter referred to as "reference pitch angle") of the head 204 indicates a state in which the head 204 does not turn upward or downward as illustrated in FIG. 2. The angle of −100 indicates the lower limit of the downward turn and the angle of +100 indicates the upper limit of the upward turn. If the head 204 turns upward or downward about the second rotational axis to the reference pitch angle or an angle located below the reference pitch angle, the head 204 is contactable, via the outer cover 201, with the placement surface (for example, floor or table) on which the robot 200 is placed. The first rotational axis is orthogonal to the second rotational axis in the example illustrated in FIG. 2 but does not have to be orthogonal to the second rotational axis.

As illustrated in FIG. 2, the head 204 of the robot 200 is equipped with a touch sensor 211 so as to detect that a user is patting or slapping the head 204. The body 206 is also equipped with another touch sensor 211 so as to detect that the user is patting or slapping the body 206.

The body 206 of the robot 200 is further equipped with an acceleration sensor 212 so as to detect the orientation of the robot 200 itself and detect that the user is lifting, turning, or throwing the robot 200. The body 206 of the robot 200 is further equipped with a microphone 213 so as to detect external sounds. The body 206 of the robot 200 is further equipped with a speaker 231, which is used to emit a sound of the robot 200.

Although the acceleration sensor 212, the microphone 213, and the speaker 231 are included in the body 206 according to the embodiment, some or all of these components may be included in the head 204. Alternatively, the head 204 may include some or all of the acceleration sensor, microphone, and speaker in addition to the acceleration sensor 212, the microphone 213, and the speaker 231 included in the body 206.

According to the embodiment, because of the outer cover 201 over the housing 207 of the robot 200, the head 204 and the body 206 are in indirect contact via the outer cover 201 with the placement surface (for example, floor or table) on which the robot 200 is placed. This configuration, however, should not be construed as limiting the disclosure. The head 204 and the body 206 may also be in direct contact with the placement surface. For example, the outer cover 201 may have no bottom portion (portion to be in contact with the placement surface) and thus expose the bottom portion (portion to be in contact with the placement surface) of the housing 207. Alternatively, the entire housing 207 may be exposed due to the absence of the outer cover 201.

Figure 8:
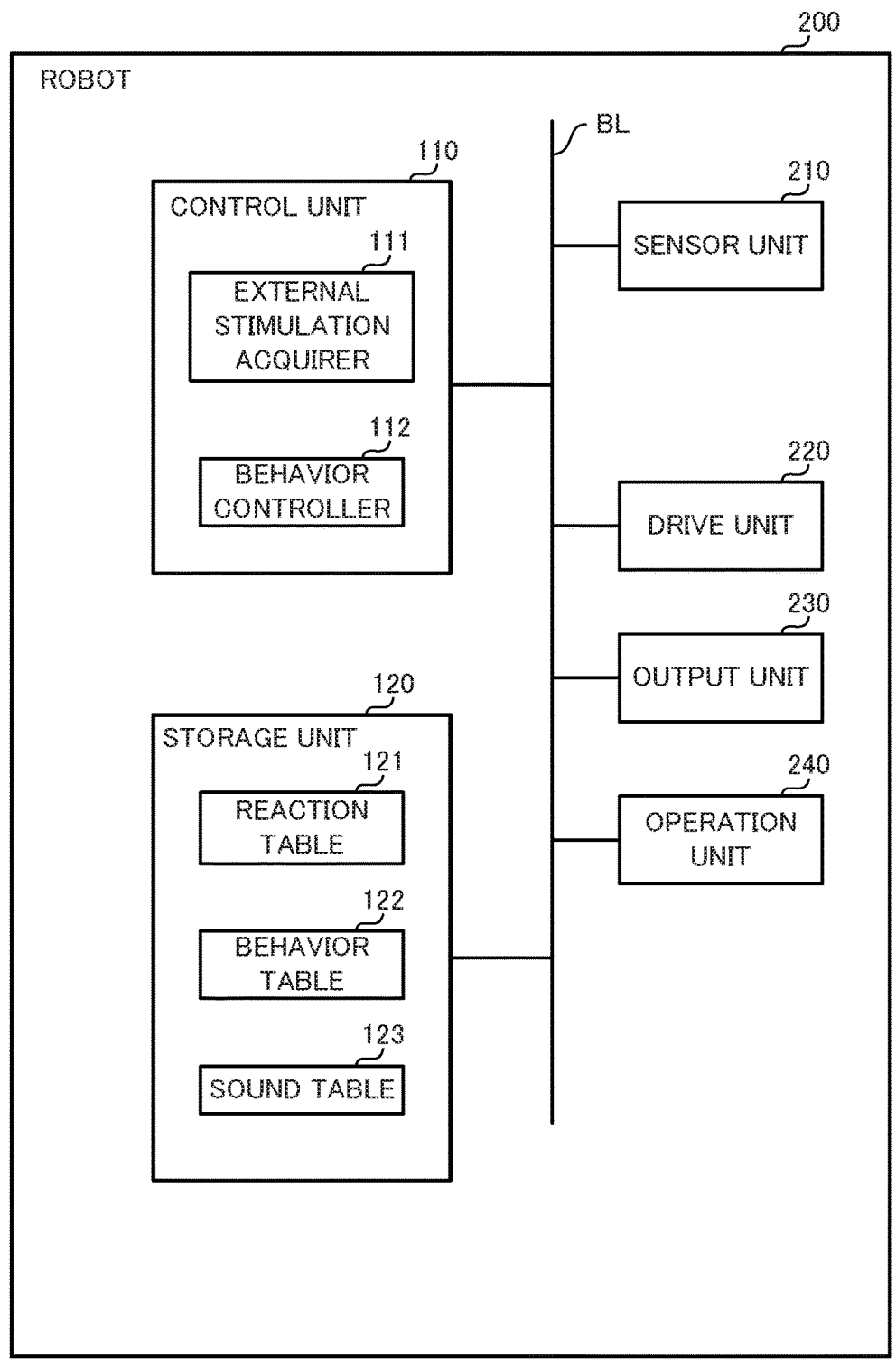
FIG. 8 is a block diagram illustrating a functional configuration of the robot according to Embodiment 1.

A functional configuration of the robot 200 will now be described. With reference to FIG. 8, the robot 200 has a control unit 110, a storage unit 120, a sensor unit 210, a drive unit 220, an output unit 230, and an operation unit 240, which are connected to each other via bus lines BL.

The control unit 110 includes, for example, a central processing unit (CPU) functioning as at least one processor. The control unit 110 executes programs stored in the storage unit 120 and thereby performs functions of individual components (an external stimulation acquirer 111 and a behavior controller 112), which will be described later. The control unit 110 also has clocking and timer functions (not shown) and can determine the date and time, for example.

The storage unit 120 includes, for example, a read-only memory (ROM), a flash memory, and a random access memory (RAM). The ROM preliminarily stores the programs to be executed by the CPU of the control unit 110 and data necessary for execution of the programs. The flash memory is a writable non-volatile memory and stores data that should be maintained even after power-off. The RAM stores data generated or modified during the execution of the programs.

The sensor unit 210 includes the above-mentioned touch sensors 211, acceleration sensor 212, and microphone 213. The control unit 110 acquires the values detected by these sensors included in the sensor unit 210 through the bus lines BL in the form of external stimulations. The sensor unit 210 may include other sensors as well as the touch sensors 211, the acceleration sensor 212, and the microphone 213. As the number of types of sensors included in the sensor unit 210 increases, the number of types of external stimulations acquired by the control unit 110 also increases.

The touch sensors 211 detect contact with any object. Each of the touch sensors 211 includes, for example, a pressure sensor or an electrostatic capacitance sensor. On the basis of the detected values from the touch sensors 211, the control unit 110 detects that the user is tapping or slapping the robot 200, for example.

The acceleration sensor 212 detects accelerations in the three directions: the front-rear direction, the width (right-left) direction, and the up-down direction of the body 206 of the robot 200. The acceleration sensor 212 detects the gravitational acceleration while the robot 200 stands still. The control unit 110 can thus detect the current orientation of the robot 200 on the basis of the gravitational acceleration detected by the acceleration sensor 212. For example, if the user is lifting or throwing the robot 200, the acceleration sensor 212 detects an acceleration caused by the travel of the robot 200 in addition to the gravitational acceleration. The control unit 110 subtracts the component of gravitational acceleration from the value detected by the acceleration sensor 212 and can thereby detect the travel of the robot 200.

The microphone 213 detects sounds around the robot 200. On the basis of the sound components detected by the microphone 213, the control unit 110 can detect that the user is calling the robot 200 or clapping the hands, for example.

The drive unit 220 includes the roll motor 221 and the pitch motor 222 functioning as at least one actuator. The drive unit 220 is controlled by the control unit 110 and thus causes the head 204 to turn. This operation enables the robot 200 to, for example, raise the head 204 (turn the head 204 upward about the second rotational axis), incline the head 204 (twist the head 204 about the first rotational axis in the right-hand or left-hand direction), or perform other behaviors. These behaviors require behavior control data, which is recorded in a behavior table 122 (described later).

The output unit 230 includes a speaker 231. The speaker 231 outputs a sound in response to input of data on a sound from the control unit 110 to the output unit 230. For example, the control unit 110 inputs data on a sound of the robot 200 to the output unit 230. The robot 200 thus emits a simulated sound. The data on the sound is recorded in a sound table 123 (described later).

The output unit 230 may include a display (for example, liquid crystal display) or an illuminator (for example, light emitting diode (LED)) instead of or in addition to the speaker 231. In this case, the storage unit 120 is required to preliminarily store the content to be output on the display or the color or brightness of the illuminator in association with each external stimulation in the form of, for example, a display content table or illumination content table.

The operation unit 240 includes, for example, operation buttons and a volume knob. The operation unit 240 is an interface for receiving operations from the user, such as power-on and -off operations and an operation of adjusting the volume of output sounds.

The functional configuration of the control unit 110 will now be described. The control unit 110 serves as the external stimulation acquirer 111 and the behavior controller 112.

The external stimulation acquirer 111 acquires external stimulations applied from the outside to the robot 200, on the basis of the detected values from the sensor unit 210. The sensors (the touch sensors 211, the acceleration sensor 212, and the microphone 213) included in the sensor unit 210 allow the external stimulation acquirer 111 to acquire a plurality of external stimulations of mutually different types.

In response to the external stimulations acquired by the external stimulation acquirer 111, the behavior controller 112 controls the drive unit 220 and causes the output unit 230 to emit a sound.

The reaction table 121, the behavior table 122, and the sound table 123 will now be described in sequence. These tables are part of the data stored in the storage unit 120 and characterize the embodiment.

As in an example illustrated in FIG. 9, the reaction table 121 defines how the robot 200 reacts to the acquired external stimulations. The external stimulations listed in the reaction table 121 mainly include the external stimulations detected by the sensor unit 210 but may also include other stimulations. For example, the external stimulations may be any information available by the control unit 110, such as the notification from a clock listed at the bottom of FIG. 9.

As in an example illustrated in FIGS. 10 to 14, the behavior table 122 defines behavior control data for controlling the drive unit 220 in association with the individual reactions defined in the reaction table 121. Specifically, the behavior table 122 defines the rotational angles of the head 204 achieved by the pitch motor 222 and the roll motor 221 at the individual times, in association with each reaction. FIGS. 10 to 14 list the data "time: rotational angle of the pitch motor 222: rotational angle of the roll motor 221" in each row. The unit of time is millisecond. The rotational angle of the pitch motor 222 has the upper limit of 100, the intermediate value (reference pitch angle) of 0, and the lower limit of −100. The rotational angle of the roll motor 221 has the left limit of 100, the intermediate value (reference roll angle) of 0, and the right limit of −100. As illustrated in FIGS. 10 to 14, the behavior control data is a series of sequential data (in the order of "time: rotational angle of the pitch motor 222: rotational angle of the roll motor 221" in this example) for controlling the drive unit 220 in association with each reaction. The control executed by the behavior controller 112 over the drive unit 220 on the basis of this series of sequential data will be referred to as "execution of a behavior sequence".

The behavior controller 112 controls the drive unit 220 such that the rotational angles of the roll motor 221 and the pitch motor 222 are adjusted to the respective rotational angles at the time defined in each row of the behavior table 122. That is, the behavior controller 112 controls not only the rotational angles of the motors of the drive unit 220 but also their rotational angular velocities, thereby causing the motors to achieve the defined rotational angles until the defined time. In other words, the behavior controller 112 controls the rotational angles and the rotational angular velocities of the head 204 to mutually different rotational angles (in the pitch and roll directions) and rotational angular velocities (in the pitch and roll directions).

The time defined in each row of the behavior table 122 indicates a normal time required for each behavior. The behavior controller 112 may control the behavior using the defined time having some fluctuations. In an exemplary case where a certain row of the behavior table 122 defines "2000:−30:0", the behavior controller 112 may adjust the rotational angle of the pitch motor 222 to the angle of −30 and adjust the rotational angle of the roll motor 221 to the angle of 0, until the time (for example, the time defined by a random number of 2000±200 or smaller) calculated by shifting the defined time by a fluctuation value (for example, random number corresponding to the tenth of the defined time or larger) determined depending on the defined time. This control enables the behavior controller 112 to increase or decrease the rotational velocities of the motors during execution of the behavior sequence associated with a certain reaction.

The behavior controller 112 may halt the roll motor 221 and the pitch motor 222 to temporarily stop the movement of the head 204 during execution of the behavior sequence associated with a certain reaction. In this case, the behavior controller 112 may temporarily stop the movement of the head 204 by halting each of the motors in a period shorter than the period defined by the inverse of the latest rotational velocity of the motor (for example, in the case of a rotational velocity of 60 rotations per minute (rpm), the defined period is 1/60 minutes=one second).

The following explanation is directed to behaviors associated with the respective reactions. These behaviors are defined in the behavior table 122 in detail. Some representative behaviors are achieved by execution of at least one of the below-explained six control schemes: first control scheme, second control scheme, third control scheme, fourth control scheme, fifth control scheme, or sixth control scheme.

The first control scheme involves causing the head 204 to alternately repeat normal and reverse turns about the first rotational axis in a state in which the head 204 is positioned about the second rotational axis at a first initial angle (for example, angle of 80) or a second initial angle (for example, angle of −50), by driving both of the roll motor 221 and the pitch motor 222. In the first control scheme, the rotational angle of the head 204 about the first rotational axis is controlled within a relatively wide first angle range (for example, range between the angle of 80 and the angle of −80), and the rotational angular velocity of the head 204 about the first rotational axis is controlled to a relatively low first angular velocity. The first angular velocity allows the head 204 to repeat turning from one end to the other end of the first angle range (for example, from the angle of 80 to the angle of −80) for a first period (for example, 0.5 seconds), and from the other end to the one end (for example, from the angle of −80 to the angle of 80) for the first period.

The second control scheme involves causing the head 204 to alternately repeat normal and reverse turns about the first rotational axis in a state in which the head 204 is positioned about the second rotational axis at a third initial angle (for example, angle of 100), by driving both of the roll motor 221 and the pitch motor 222. In the second control scheme, the rotational angle of the head 204 about the first rotational axis is controlled within a second angle range (for example, range between the angle of 40 and the angle of −40) narrower than the first angle range, and the rotational angular velocity of the head 204 about the first rotational axis is controlled to a second angular velocity higher than the first angular velocity. The second angular velocity allows the head 204 to repeat turning from one end to the other end of the second angle range (for example, from the angle of 40 to the angle of −40) for a second period (for example, 0.2 seconds), and from the other end to the one end (for example, from the angle of −40 to the angle of 40) for the second period.

The third control scheme involves causing the head 204 to alternately repeat normal and reverse turns about the second rotational axis in a state in which the head 204 is positioned about the first rotational axis at the reference roll angle, by driving both of the roll motor 221 and the pitch motor 222. In the third control scheme, the rotational angle of the head 204 about the second rotational axis is controlled within a third angle range (for example, range between the angle of −100 and the angle of −80) narrower than the first angle range and located below the reference pitch angle, and the rotational angular velocity of the head 204 about the second rotational axis is controlled to a third angular velocity lower than the first angular velocity. The third angular velocity allows the head 204 to repeat turning from one end to the other end of the third angle range (for example, from the angle of −100 to the angle of −80) for a third period (for example, 0.3 seconds), and from the other end to the one end (for example, from the angle of −80 to the angle of −100) for the third period.

The fourth control scheme involves causing the head 204 to alternately repeat normal and reverse turns about the first rotational axis in a state in which the head 204 is positioned about the second rotational axis at a fourth initial angle (for example, angle of −50), by driving both of the roll motor 221 and the pitch motor 222. In the fourth control scheme, the rotational angle of the head 204 about the first rotational axis is controlled within the relatively wide first angle range (for example, range between the angle of 80 and the angle of −80), and the rotational angular velocity of the head 204 about the first rotational axis is controlled to a fourth angular velocity lower than the first angular velocity. The fourth angular velocity allows the head 204 to repeat turning from one end to the other end of the first angle range (for example, from the angle of 80 to the angle of −80) for a fourth period (for example, two seconds), and from the other end to the one end (for example, from the angle of −80 to the angle of 80) for the fourth period.

The fifth control scheme involves causing the head 204 to alternately repeat normal and reverse turns about the second rotational axis in a state in which the head 204 is positioned about the first rotational axis at the reference roll angle, by driving both of the roll motor 221 and the pitch motor 222. In the fifth control scheme, the rotational angle of the head 204 about the second rotational axis is controlled within any of a fifth angle range (for example, range between the angle of −20 and the angle of −60) narrower than the first angle range and located below the reference pitch angle, a sixth angle range (for example, range between the angle of −30 and the angle of 0) narrower than the first angle range and ranging from an angle below the reference pitch angle to the reference pitch angle, and a seventh angle range (for example, range between the angle of 30 and the angle of 0) narrower than the first angle range and ranging from an angle above the reference pitch angle to the reference pitch angle. In addition, the rotational angular velocity of the head 204 about the second rotational axis is controlled to any of a fifth angular velocity lower than the fourth angular velocity, a sixth angular velocity lower than the fourth angular velocity and higher than the fifth angular velocity, and a seventh angular velocity lower than the fifth angular velocity, in the fifth control scheme. The fifth angular velocity allows the head 204 to repeat turning from one end to the other end of the fifth angle range (for example, from the angle of −20 to the angle of −60) for a fifth period (for example, three seconds), and from the other end to the one end (for example, from the angle of −60 to the angle of −20) for the fifth period. The sixth angular velocity allows the head 204 to repeat turning from one end to the other end of the sixth angle range (for example, from the angle of −30 to the angle of 0) for a sixth period (for example, two seconds), and from the other end to the one end (for example, from the angle of 0 to the angle of −30) for the sixth period. The seventh angular velocity allows the head 204 to repeat turning from one end to the other end of the seventh angle range (for example, from the angle of 30 to the angle of 0) for a seventh period (for example, three seconds), and from the other end to the one end (for example, from the angle of 0 to the angle of 30) for the seventh period.

The sixth control scheme involves causing the head 204 to be positioned about the second rotational axis at a fifth initial angle (for example, angle of 80) and then causing the head 204 to alternately repeat normal and reverse turns about the first rotational axis and alternately repeat normal and reverse turns of the head 204 about the second rotational axis, by driving both of the roll motor 221 and the pitch motor 222. In the driving of the roll motor 221 in the sixth control scheme, the head 204 is caused to alternately repeat normal and reverse turns about the first rotational axis, such that the rotational angle of the head 204 about the first rotational axis is controlled within the second angle range (for example, range between the angle of 40 and the angle of −40) narrower than the first angle range, and the rotational angular velocity of the head 204 about the first rotational axis is controlled to the second angular velocity higher than the first angular velocity. The second angular velocity allows the head 204 to repeat turning from one end to the other end of the second angle range (for example, from the angle of 40 to the angle of −40) for the second period (for example, 0.2 seconds), and from the other end to the one end (for example, from the angle of −40 to the angle of 40) for the second period. In the driving of the pitch motor 222 in the sixth control scheme, the head 204 is caused to alternately repeat normal and reverse turns about the second rotational axis, such that the rotational angle of the head 204 about the second rotational axis is controlled within an eighth angle range (for example, range between the angle of 60 and the angle of 100) narrower than the first angle range and located above the reference pitch angle, and the rotational angular velocity of the head 204 about the second rotational axis is controlled to an eighth angular velocity higher than the first angular velocity. The eighth angular velocity allows the head 204 to repeat turning from one end to the other end of the eighth angle range (for example, from the angle of 60 to the angle of 100) for the second period (for example, 0.2 seconds), and from the other end to the one end (for example, from the angle of 100 to the angle of 60) for the second period.

In association with the reaction of "respire" in response to no external stimulation, the behavior controller 112 drives the roll motor 221 and the pitch motor 222 under the above-explained fifth control scheme, as illustrated in FIG. 10. The behavior controller 112 first causes the head 204 to be positioned about the first rotational axis at the reference roll angle. The behavior controller 112 then turns the head 204 about the second rotational axis to one end (for example, angle of −20) of the fifth angle range (for example, range between the angle of −20 and the angle of −60) located below the reference pitch angle. The behavior controller 112 then causes the head 204 to alternately repeat a normal turn (for example, turn from the angle of −60 to the angle of −20) and a reverse turn (for example, turn from the angle of −20 to the angle of −60) about the second rotational axis in cycles of a reference respiration period (for example, three seconds) equal to or longer than a first reference period (for example, two seconds), which may have some fluctuations as described above. The rotational angle of the head 204 is controlled within the fifth angle range defined between two mutually different downward angles (for example, the angle of −20 and the angle of −60). The rotational angular velocity of the head 204 is controlled to the fifth angular velocity lower than any of the first to fourth and sixth angular velocities. The fifth angular velocity allows the head 204 to repeat turning from one to the other of the two downward angles (for example, by an angle of −40 from the angle of −20 to the angle of −60) for the reference respiration period (for example, three seconds) and from the other to the one of the two angles (for example, by an angle of 40 from the angle of −60 to the angle of −20) for the reference respiration period. Since an angle within the fifth angle range is negative or located below the reference pitch angle (angle of 0), this control maintains the head 204 to face downward and change its angle, so that the central portion of the housing 207 periodically repeats small up-down movements. The reference respiration period equal to or longer than the first reference period should preferably be at least two seconds, in order to achieve slow up-down movements of the robot 200 that represent respiration. Although the respiration process illustrated in FIG. 10 ends at the time of 24 seconds, the process may return to the time of three seconds and repeats the up-down movements. This respiration process allows the robot 200 to behave like an animal despite of no external stimulation.

In association with the reaction of "get surprised" in response to detection of a loud sound at the microphone 213, the behavior controller 112 rapidly (for example, within 0.1 seconds) turns the head 204 (neck) upward from the reference pitch angle (angle of 0) by driving the pitch motor 222, as illustrated in FIG. 10. This process allows the robot 200 to represent a surprised and alerted behavior like an animal.

In association with the reaction of "get pleased" in response to detection of being tapped at the touch sensor 211 of the body 206, the behavior controller 112 drives the roll motor 221 and the pitch motor 222 under the above-explained first control scheme, as illustrated in FIG. 10. The behavior controller 112 first causes the head 204 (neck) to be positioned at an angle turned about the second rotational axis upward from the reference pitch angle to the first initial angle (for example, angle of 80). In a state in which the head 204 is positioned at the angle turned upward, the behavior controller 112 then causes the head 204 to alternately repeat normal and reverse turns about the first rotational axis, such that the rotational angle of the head 204 is controlled within the first angle range, and the rotational angular velocity of the head 204 is controlled to the first angular velocity. The head 204 thus remains turned upward from the reference pitch angle and makes relatively slow twists in the right-hand and left-hand directions relative to the reference roll angle. The robot 200 thus represents a pleased behavior like an animal.

In association with the reaction of "get excited" in response to detection of being held, the behavior controller 112 drives the roll motor 221 and the pitch motor 222 under the above-explained second control scheme, as illustrated in FIG. 10. The behavior controller 112 first causes the head 204 (neck) to be positioned at an angle turned about the second rotational axis upward from the reference pitch angle to the third initial angle (for example, angle of 100). In a state in which the head 204 is positioned at the angle turned upward, the behavior controller 112 then causes the head 204 to alternately repeat normal and reverse turns about the first rotational axis, such that the rotational angle of the head 204 is controlled within the second angle range narrower than the first angle range, and the rotational angular velocity of the head 204 is controlled to the second angular velocity higher than the first angular velocity. The head 204 thus remains turned upward from the reference pitch angle and makes rapid and small twists in the right-hand and left-hand directions relative to the reference roll angle. The robot 200 thus represents an excited behavior like an animal.

In association with the reaction of "get angry" in response to detection of being slapped at the touch sensor 211 of the head 204, the behavior controller 112 drives the roll motor 221 and the pitch motor 222 under the above-explained sixth control scheme, as illustrated in FIG. 11. The behavior controller 112 first causes the head 204 (neck) to be positioned at an angle turned about the second rotational axis upward from the reference pitch angle to the fifth initial angle (for example, angle of 80). The behavior controller 112 then causes the head 204 to alternately repeat normal and reverse turns about the first rotational axis and alternately repeat normal and reverse turns about the second rotational axis. The rotational angle of the head 204 about the first rotational axis is controlled within the second angle range (for example, range between the angle of 40 and the angle of −40) narrower than the first angle range, and the rotational angular velocity of the head 204 about the first rotational axis is controlled to the second angular velocity (for example, angular velocity that allows the head 204 to turn from the angle of 40 to the angle of −40 for 0.2 seconds) higher than the first angular velocity. The rotational angle of the head 204 about the second rotational axis is controlled within the eighth angle range narrower than the first angle range and located above the reference pitch angle, and the rotational angular velocity of the head 204 about the second rotational axis is controlled to the eighth angular velocity higher than the first angular velocity. The head 204 thus remains turned upward from the reference pitch angle, makes rapid and small turns in the up-down directions relative to the reference pitch angle, and makes rapid and small twists in the right-hand and left-hand directions relative to the reference roll angle. The robot 200 thus represents an angry behavior like an animal.

In association with the reaction of "get nervous" in response to detection of being thrown, the behavior controller 112 drives the roll motor 221 and the pitch motor 222 under the above-explained first control scheme, as illustrated in FIG. 11. The behavior controller 112 first causes the head 204 to be positioned at an angle turned about the second rotational axis slightly downward from the reference pitch angle to the second initial angle (for example, angle of −50). In a state in which the head 204 is positioned at the angle turned downward, the behavior controller 112 then causes the head 204 to alternately repeat normal and reverse turns about the first rotational axis, such that the rotational angle of the head 204 is controlled within the first angle range, and the rotational angular velocity of the head 204 is controlled to the first angular velocity. The head 204 thus remains turned downward from the reference pitch angle and makes twists in the right-hand and left-hand directions relative to the reference roll angle. The robot 200 thus represents a nervous behavior like an animal.

In association with the reaction of "get sad" in response to detection of being slapped at the touch sensor 211 of the body 206, the behavior controller 112 drives the roll motor 221 and the pitch motor 222 under the above-explained third control scheme, as illustrated in FIG. 11. The behavior controller 112 first causes the head 204 to be positioned about the first rotational axis at the reference roll angle. In a state in which the head 204 is positioned at the reference roll angle, the behavior controller 112 then causes the head 204 to alternately repeat normal and reverse turns about the second rotational axis, such that the rotational angle of the head 204 about the second rotational axis is controlled within the third angle range narrower than the first angle range and located below the reference pitch angle, and the rotational angular velocity of the head 204 about the second rotational axis is controlled to the third angular velocity lower than the first angular velocity. The head 204 thus makes small turns about the second rotational axis in the up-down directions relative to the reference pitch angle. The robot 200 thus represents a sad behavior like an animal.

In association with the reaction of "get dispirited" in response to detection of being suspended in the air, the behavior controller 112 drives the roll motor 221 and the pitch motor 222 under the above-explained fourth control scheme, as illustrated in FIG. 11. The behavior controller 112 first causes the head 204 to be positioned at an angle turned about the second rotational axis slightly downward from the reference pitch angle to the fourth initial angle. In a state in which the head 204 is positioned at the angle turned downward, the behavior controller 112 then causes the head 204 to alternately repeat normal and reverse turns about the first rotational axis, such that the rotational angle of the head 204 about the first rotational axis is controlled within the first angle range, and the rotational angular velocity of the head 204 about the first rotational axis is controlled to the fourth angular velocity lower than the first angular velocity. The head 204 thus makes slow twists in the right-hand and left-hand directions relative to the reference roll angle. The robot 200 thus represents a spiritless behavior like an animal.

In association with the reaction of "get calm" in response to detection of a small sound at the microphone 213, the behavior controller 112 drives the roll motor 221 and the pitch motor 222 under the above-explained fifth control scheme, as illustrated in FIG. 12. The behavior controller 112 first causes the head 204 to be positioned about the first rotational axis at the reference roll angle. In a state in which the head 204 is positioned at the reference roll angle, the behavior controller 112 then causes the head 204 to alternately repeat normal and reverse turns about the second rotational axis, such that the rotational angle of the head 204 about the second rotational axis is controlled within the sixth angle range (for example, range between the angle of −30 and the angle of 0) narrower than the first angle range and ranging from an angle below the reference pitch angle to the reference pitch angle, and the rotational angular velocity of the head 204 about the second rotational axis is controlled to the sixth angular velocity lower than the fourth angular velocity and higher than the fifth angular velocity. The head 204 thus remains turned slightly downward and makes slow turns about the second rotational axis in the up-down directions relative to the reference pitch angle. The robot 200 thus represents a calm behavior like an animal.

In association with the reaction of "get relaxed" in response to detection of being tapped at the touch sensor 211 of the head 204, the behavior controller 112 drives the roll motor 221 and the pitch motor 222 under the above-explained fifth control scheme, as illustrated in FIG. 12. The behavior controller 112 first causes the head 204 to be positioned about the first rotational axis at the reference roll angle. In a state in which the head 204 is positioned at the reference roll angle, the behavior controller 112 then causes the head 204 to alternately repeat normal and reverse turns about the second rotational axis, such that the rotational angle of the head 204 about the second rotational axis is controlled within the seventh angle range (for example, range between the angle of 30 and the angle of 0) narrower than the first angle range and ranging from an angle above the reference pitch angle to the reference pitch angle, and the rotational angular velocity of the head 204 about the second rotational axis is controlled to the seventh angular velocity lower than the fifth angular velocity. The head 204 thus remains turned slightly upward and makes slow turns about the second rotational axis in the up-down directions relative to the reference pitch angle. The robot 200 thus represents a relaxed behavior like an animal.

In association with the reaction of "make a right turn" in response to detection of a voice of "right" at the microphone 213, the behavior controller 112 causes the head 204 to make large turns in the right-left and up-down directions, as illustrated in FIG. 12. The robot 200 thus turns right about the vertical axis extending from the body 206.

In more detail, the behavior controller 112 achieves turns by repeating the sequence of a turn preparation control scheme and first and second turn control schemes (explained later) in this order. The turn preparation control scheme involves turning the head 204 upward about the second rotational axis apart from the placement surface to a reference non-contact angle (for example, angle of 50) by driving the pitch motor 222, and twisting the head 204 about the first rotational axis to a turn preparation angle (for example, angle of 100) by driving the roll motor 221.

In the first turn control scheme, the behavior controller 112 turns the head 204 downward to a reference contact angle (for example, angle of −100) by driving the pitch motor 222 and thereby brings the head 204 into contact with the placement surface. The behavior controller 112 then turns the head 204 about the first rotational axis by a first angle (for example, from the angle of 100 to the angle of −100) by driving the roll motor 221, in a state in which the head 204 is in contact with the placement surface. The head 204 is thus in contact with the placement surface while the portions of the body 206 other than the rear end are slightly lifted from the placement surface in the first turn control scheme. Accordingly, the portions of the body 206 other than the rear end exert a smaller frictional force on the placement surface in comparison to the frictional force on the placement surface exerted by the head 204 or the rear end of the body 206. The head 204 in this position makes a clockwise turn about the first rotational axis and thus receives a right-ward frictional force from the placement surface. The robot 200 thus turns right about the vertical axis extending from the body 206.

In the second turn control scheme, the behavior controller 112 turns the head 204 upward about the second rotational axis apart from the placement surface by driving the pitch motor 222, and then turns the head 204 about the first rotational axis to the original rotational angle before the turn by the first angle (for example, from the angle of −100 to the angle of 100) by driving the roll motor 221. This process keeps the head 204 away from the placement surface (that is, eliminates the frictional force between the head 204 and the placement surface) and turns the head 204 about the first rotational axis back to the original rotational angle at which the above-explained first turn control scheme is available. In the second turn control scheme, the head 204 may be turned about the first rotational axis back to the original rotational angle after completion of being turned upward about the second rotational axis apart from the placement surface. Alternatively, the head 204 may be turned about the first rotational axis back to the original rotational angle while being turned upward about the second rotational axis apart from the placement surface.

In association with the reaction of "make a large right turn" in response to detection of a voice of "right-about-face" at the microphone 213, the behavior controller 112 causes the head 204 to make large turns in the right-left and up-down directions, as illustrated in FIG. 13. The robot 200 thus makes a large right turn about the vertical axis extending from the body 206.

In more detail, the large right turn is achieved by repeating the above-explained first and second turn control schemes in this order the number of times larger than (for example, twice as large as) the number of times of repetition associated with the reaction of "make a right turn".

In association with the reaction of "make a left turn" in response to detection of a voice of "left" at the microphone 213, the behavior controller 112 causes the head 204 to make large turns in the right-left and up-down directions, as illustrated in FIG. 13. The robot 200 thus turns left about the vertical axis extending from the body 206.

In more detail, the left turn is achieved by repeating the above-explained first and second turn control schemes in this order. It should be noted that the head 204 is turned by the angle (for example, from the angle of −100 to the angle of 100) inversed from the above-mentioned first angle associated with the reaction of "make a right turn".

In association with the reaction of "make a large left turn" in response to detection of a voice of "left-about-face" at the microphone 213, the behavior controller 112 causes the head 204 to make large turns in the right-left and up-down directions, as illustrated in FIG. 14. The robot 200 thus makes a large left turn about the vertical axis extending from the body 206.

In more detail, the large left turn is achieved by repeating the above-explained first and second turn control schemes in this order the number of times larger than (for example, twice as large as) the number of times of repetition associated with the reaction of "make a left turn". It should be noted that the head 204 is turned by the angle (for example, from the angle of −100 to the angle of 100) inversed from the above-mentioned first angle associated with the reaction of "make a right turn".

In association with the reaction of "announce time" in response to notification of the top of every hour from a clock included in the control unit 110, the behavior controller 112 turns the head 204 upward from the reference pitch angle by driving the pitch motor 222, and then shakes the head 204 in the right-hand and left-hand directions relative to the reference roll angle by normal and reverse turns of the roll motor 221, as illustrated in FIG. 14. The robot 200 thus represents a behavior for announcing time.

With reference to FIG. 15, the sound table 123 defines sound data to be output from the output unit 230 in association with the individual reactions defined in the reaction table 121. The sound data indicates audio data on sounds to be emitted. Although FIG. 15 lists phrases for describing the sound data so as to facilitate understanding, the actual sound table 123 stores the sound data itself described by these phrases.

A robot controlling process executed by the control unit 110 of the robot 200 will now be explained with reference to the flowchart of FIG. 16. The robot controlling process indicates the process of the control unit 110 for controlling the behavior and sound of the robot 200 on the basis of the detected values from the sensor unit 210 and the like. The robot controlling process is initiated when the user turns on the robot 200.

The external stimulation acquirer 111 first acquires an external stimulation from the sensor unit 210 (Step S101).

The behavior controller 112 then determines how to react to the external stimulation acquired in Step S101 by referring to the reaction table 121 (Step S102).

The behavior controller 112 then acquires behavior control data and sound data in accordance with the reaction determined in Step S102 (Step S103).

The behavior controller 112 then controls the behavior and sound of the robot 200 in accordance with the behavior control data and the sound data acquired in Step S103 (Step S104). Specifically, the behavior controller 112 controls the drive unit 220 using the behavior control data acquired in Step S103, and causes the output unit 230 to emit a sound using the sound data acquired in Step S103.

The control unit 110 then determines whether to terminate the process (Step S105). For example, the process is terminated if the operation unit 240 receives an instruction to turn off the robot 200. If determining to terminate the process (Step S105; Yes), the control unit 110 terminates the robot controlling process.

If determining not to terminate the process (Step S105; No), the control unit 110 returns to Step S101.

In the above-explained robot controlling process, the robot 200 is capable of turning behaviors unimaginable from its simple structure including the head 204 and the body 206 coupled via the joint 205.

In addition, the robot 200 is capable of various animalistic behaviors as if the robot 200 is a living animal, despite of such a simple structure.

As an example of the various animalistic behaviors, the robot 200 is able to represent pleased, excited, and angry behaviors by directing the head 204 upward and shaking the head 204 in the right-left or up-down directions.

As another example of the various animalistic behaviors, the robot 200 is able to represent nervous, sad, and spiritless behaviors by directing the head 204 downward and shaking the head 204 in the right-left or up-down directions.

As still another example of the various animalistic behaviors, the robot 200 is able to represent respiration and calm and relaxed behaviors by slowly moving the head 204 in the up-down directions.

The robot 200 is able to represent more animalistic behaviors by using a variation in the reactions in response to external stimulations.

The robot 200 is able to represent more animalistic behaviors by providing fluctuations to the rotational velocity of the head 204.

The robot 200 is also able to represent more animalistic behaviors by temporarily stopping the movement of the head 204.

The movement of the head 204 can be temporarily stopped without providing a feeling of strangeness if the movement is stopped in a period shorter than the period defined by the inverse of the rotational velocity. The robot 200 thus is able to represent more animalistic behaviors.

Embodiment 2

Figure 17:
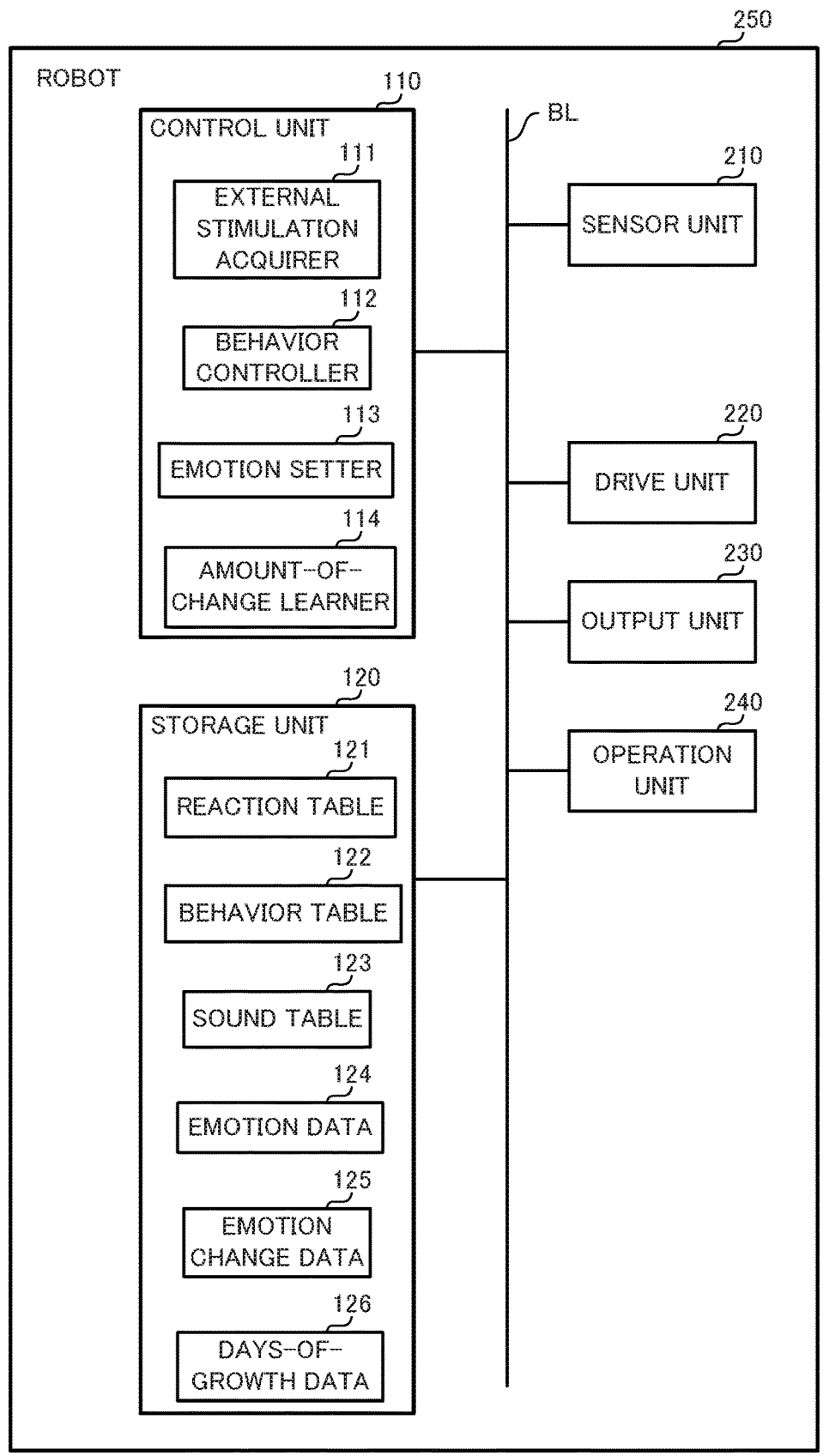
FIG. 17 is a block diagram illustrating a functional configuration of a robot according to Embodiment 2.

A robot 250 according to Embodiment 2 that can have a simulated emotion will now be described. The robot 250 has the appearance and hardware configuration identical to those of the robot 200. With reference to FIG. 17, the functional configuration of the robot 250 includes an emotion setter 113, an amount-of-change learner 114, emotion data 124, emotion change data 125, and days-of-growth data 126 in addition to the functional configuration of the robot 200. The emotion data 124, the emotion change data 125, and the days-of-growth data 126 should preferably be maintained even after power-off of the robot 250 and are therefore stored in a non-volatile memory, such as the flash memory of the storage unit 120.

The emotion setter 113 sets emotion parameters (emotion data 124) indicating a simulated emotion of the robot 250 in accordance with the external stimulations acquired by the external stimulation acquirer 111 and emotion change parameters (described later).

The amount-of-change learner 114 learns and stores the emotion change parameters (emotion change data 125) for changing the simulated emotion of the robot 250, in accordance with the external stimulations acquired by the external stimulation acquirer 111. Specifically, the amount-of-change learner 114 increments or decrements the emotion change data 125 in accordance with the external stimulations, in a robot controlling process (explained later).

Figure 18:
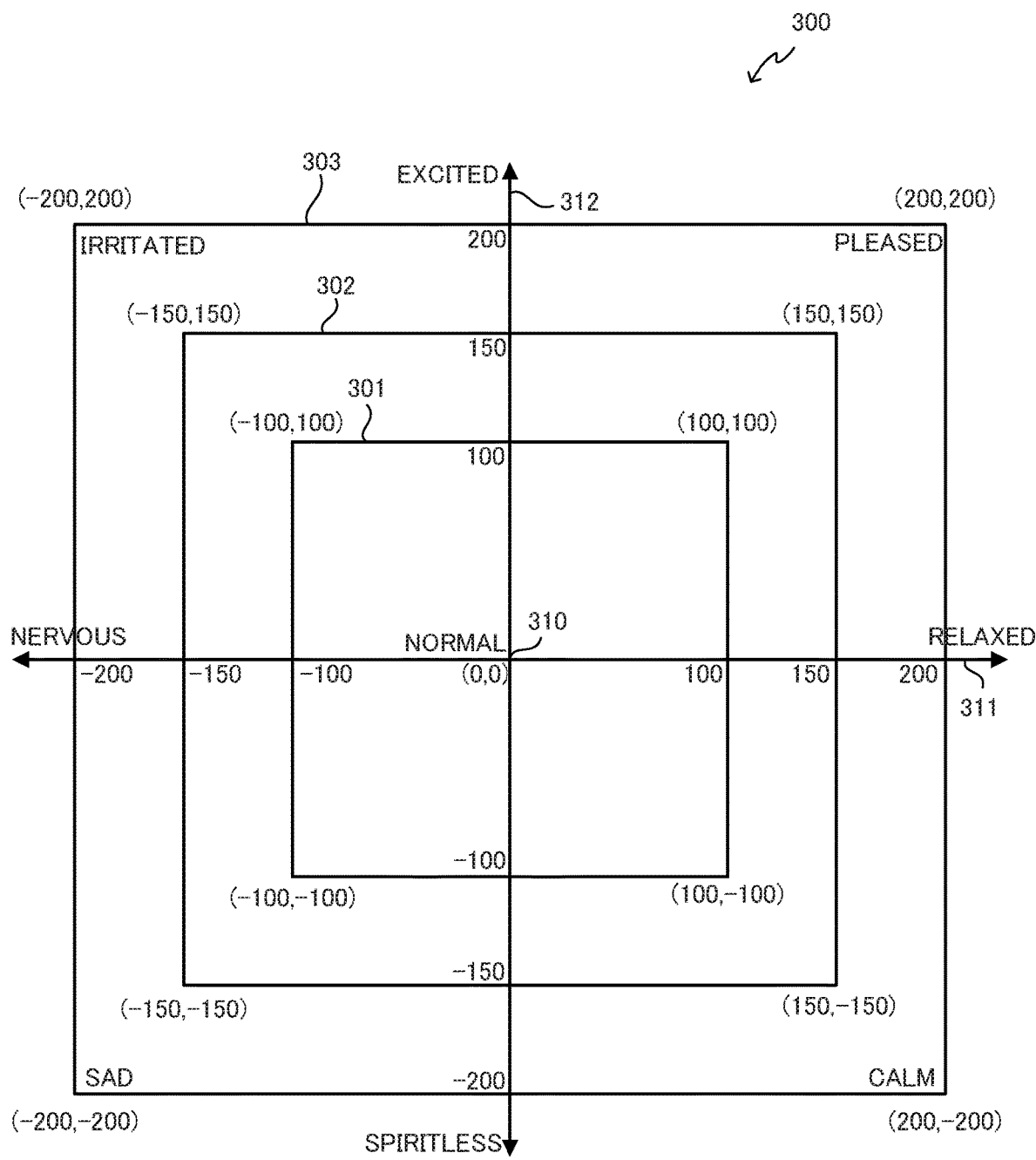
FIG. 18 is a diagram for describing an exemplary emotion map according to Embodiment 2.

The emotion data 124 provides the robot 250 with a simulated emotion. The emotion data 124 indicates coordinates (X, Y) on an emotion map 300, as illustrated in FIG. 18. The emotion map 300 is depicted as a two-dimensional coordinate system having an X axis 311 indicating the degree of relaxation (degree of nervousness) and a Y axis 312 indicating the degree of excitement (degree of spiritlessness), as illustrated in FIG. 18. The emotion map 300 has an origin 310 (0, 0) indicating a normal emotion. As the absolute value of a positive X coordinate value (X value) increases, the robot 250 has an emotion at a higher degree of relaxation. As the absolute value of a positive Y coordinate value (Y value) increases, the robot 250 has an emotion at a higher degree of excitement. As the absolute value of a negative X value increases, the robot 250 has an emotion at a higher degree of nervousness. As the absolute value of a negative Y value increases, the robot 250 has an emotion at a higher degree of spiritlessness.

The emotion data 124 has two values: the X value (degree of relaxation and degree of nervousness) and the Y value (degree of excitement and degree of spiritlessness), which indicate a plurality of mutually different simulated emotions (four emotions in this embodiment). The point represented by the X and Y values on the emotion map 300 indicates the simulated emotion of the robot 250. The emotion data 124 has an initial value (0, 0) and is set by the emotion setter 113 in accordance with the acquired external stimulations. The emotion map 300 is depicted as a two-dimensional coordinate system in FIG. 18 but may have any dimension. For example, the emotion map 300 may have a single dimension, and the emotion data 124 may be defined by a single value. Alternatively, the emotion map 300 may have three or more dimensions using one or more additional axes, and the emotion data 124 may be defined by values, the number of which is equal to the number of dimensions of the emotion map 300.

According to the embodiment, the emotion map 300 has an initial size in which the X and Y values each have a maximum value of 100 and a minimum value of −100, as represented by a frame 301 in FIG. 18. Within a first duration, in response to every addition of a single day to the simulated days of growth of the robot 250, the maximum values in the emotion map 300 are each increased by two and the minimum values are each decreased by two. The first duration indicates a duration of simulated growth of the robot 250. The first duration is, for example, 50 days starting from the simulated birth of the robot 250. The simulated birth of the robot 250 indicates when a user activates the robot 250 for the first time since the shipment from the factory. At the days of growth of 25 days, the X and Y values each have a maximum value of 150 and a minimum value of −150, as represented by a frame 302 in FIG. 18. At the lapse of the first duration (50 days in this example), the X and Y values each have a maximum value of 200 and a minimum value of −200, as represented by a frame 303 in FIG. 18. The size of the emotion map 300 is fixed after the lapse of the first duration.

The settable range of the emotion data 124 is defined by the emotion map 300. That is, the settable range of the emotion data 124 expands with the size of the emotion map 300. Such expansion of the settable range of the emotion data 124 allows the robot 250 to express a greater variety of emotions. The expansion of the size of the emotion map 300 thus represents the simulated growth of the robot 250. The size of the emotion map 300 is fixed after the lapse of the first duration, which means completion of the simulated growth of the robot 250.

The emotion change data 125 defines amounts of increase or decrease of the respective X and Y values of the emotion data 124. According to the embodiment, the emotion change data 125 includes a DXP for increasing the X value and a DXM for decreasing the X value, which are related to the X value of the emotion data 124. The emotion change data 125 also includes a DYP for increasing the Y value and a DYM for decreasing the Y value, which are related to the Y value of the emotion data 124. That is, the emotion change data 125 includes the four variables listed below. These variables are parameters for changing the simulated emotion of the robot 250 and thus also called emotion change parameters.

DXP: tendency to get relaxed (variability of the X value to the positive direction in the emotion map)

DXM: tendency to get nervous (variability of the X value to the negative direction in the emotion map)

DYP: tendency to get excited (variability of the Y value to the positive direction in the emotion map)

DYM: tendency to get dispirited (variability of the Y value to the negative direction in the emotion map)

In an example illustrated in the embodiment, these variables have initial values of 10 and can be increased to the maximum value of 20 by the above-described amount-of-change learner 114. The amount-of-change learner 114 varies the emotion change data 125, that is, the degree of change in emotion, so that the robot 250 has various characters depending on how the user has treated the robot 250. In other words, the character of each robot 250 is uniquely established depending on the attitude of the user.

The days-of-growth data 126 has an initial value of 1 and is incremented by one every lapse of a single day. The days-of-growth data 126 indicates the number of simulated days of growth (days from the simulated birth) of the robot 250.

Figure 19:
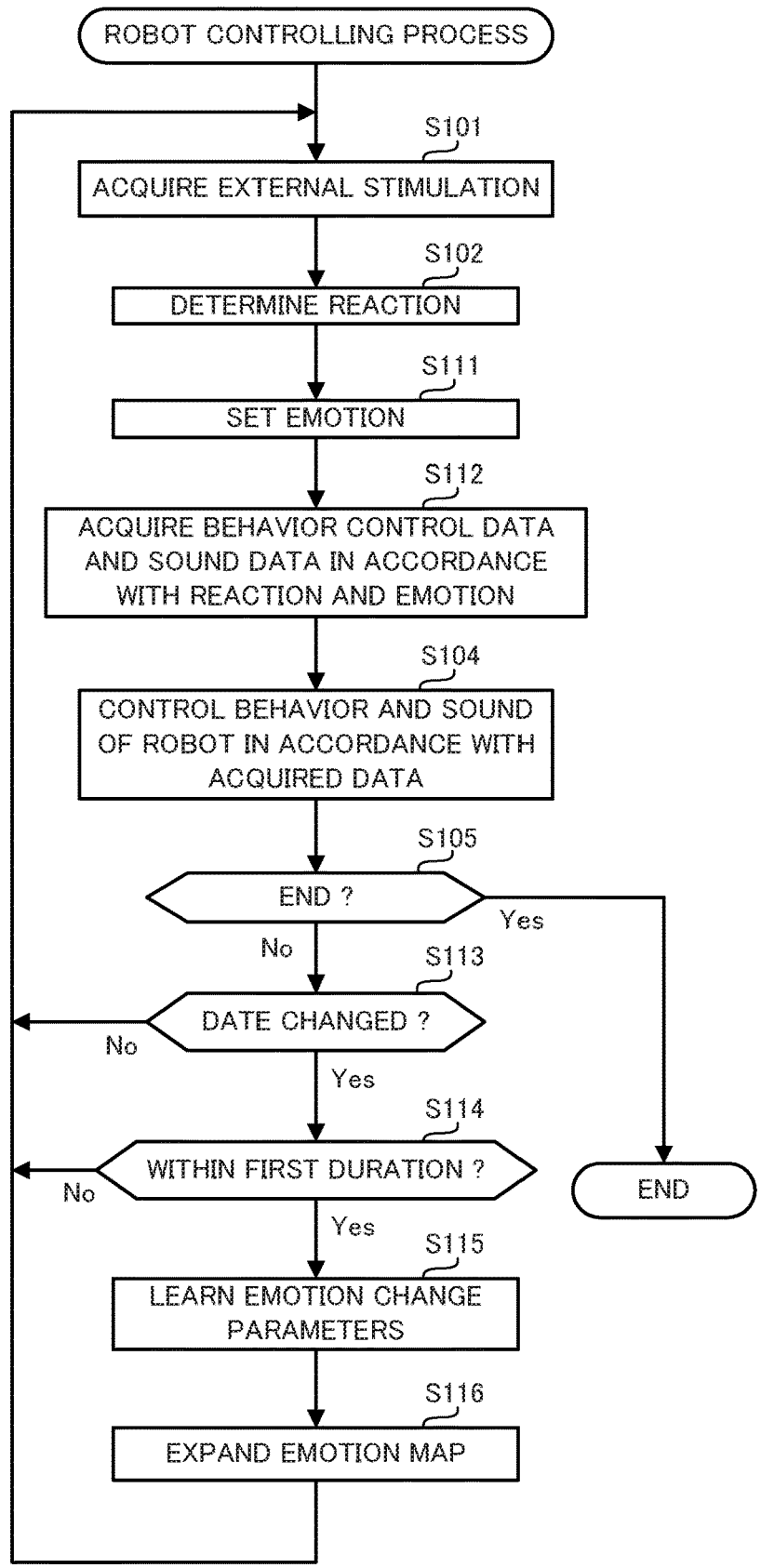
FIG. 19 is a flowchart illustrating a robot controlling process according to Embodiment 2.

A robot controlling process executed by the control unit 110 of the robot 250 will now be explained with reference to the flowchart of FIG. 19. The robot controlling process is initiated when the user turns on the robot 250. As illustrated in FIG. 19, the robot controlling process of the robot 250 is configured by replacing Step S103 of the robot controlling process of the robot 200 illustrated in FIG. 16 with Step S112, adding Step S111 between Step S102 and Step S112, and adding Steps S113 to S116 after Step S105. These additional steps will now be explained.

In Step S111, the emotion setter 113 sets emotion data 124 in accordance with the emotion change data 125 and the external stimulation acquired in Step S101. The emotion setter 113 may set the emotion data 124 in any procedure. The following explanation is directed to an exemplary setting procedure. The maximum and minimum values of the X and Y values of the emotion data 124 are defined by the size of the emotion map 300. Accordingly, the maximum value in the emotion map 300 is set if the following calculation provides a value higher than the maximum value, while the minimum value in the emotion map 300 is set if the following calculation provides a value lower than the minimum value.

Being tapped on the head 204 (get relaxed): X=X+DXP

Being slapped on the head 204 (get nervous): X=X−DXM (These external stimulations are detectable at the touch sensor 211 of the head 204.)

Being tapped on the body 206 (get excited): Y=Y+DYP

Being slapped on the body 206 (get dispirited): Y=Y−DYM (These external stimulations are detectable at the touch sensor 211 of the body 206.)

Being held in the upright position (get pleased): X=X+DXP and Y=Y+DYP

Being suspended upside down in the air (get sad): X=X−DXM and Y=Y−DYM (These external stimulations are detectable at the touch sensors 211 and the acceleration sensor 212.)

Being called by a soft voice (get calm): X=X+DXP and Y=Y−DYM

Being scolded by a loud voice (get irritated): X=X−DXM and Y=Y+DYP (These external stimulations are detectable at the microphone 213.)

In Step S112, the behavior controller 112 acquires behavior control data and sound data in accordance with the reaction determined in Step S102 and the emotion data 124 determined in Step S111. The emotion data 124 may be used in any manner during acquisition of the behavior control data and the sound data in this step. For example, the behavior control data and the sound data may be modified depending on the value of the emotion data 124. In a conceivable exemplary modification, the sound volume of the sound data may be increased according to an increase in the X value of the emotion data 124, and the time specified in the behavior control data may be shortened to increase the behavior speed according to an increase in the Y value of the emotion data 124.

Although the behavior table 122 and the sound table 123 define the behavior control data and the sound data in association with the individual reactions according to Embodiment 1, the behavior table 122 and the sound table 123 may define the behavior control data and the sound data in association with individual pairs of the reactions and the emotion data 124 according to Embodiment 2. In this case, the behavior controller 112 acquires behavior control data and sound data defined in association with the pair of the reaction determined in Step S102 and the emotion data 124 set in Step S111.

Referring back to FIG. 19, in Step S113, the control unit 110 determines whether the date has changed using the clocking function. If the date has not changed (Step S113; No), the process returns to Step S101.

If the date has changed (Step S113; Yes), the control unit 110 determines whether the present time is within the first duration (Step S114). In an exemplary case where the first duration is 50 days starting from the simulated birth of the robot 250 (from when the user activates the robot 250 for the first time since the shipment from the factory), the control unit 110 determines that the present time is within the first duration if the days-of-growth data 126 indicates 50 or smaller. If the present time is not within the first duration (Step S114; No), the process returns to Step S101.

If the present time is within the first duration (Step S114; Yes), the amount-of-change learner 114 learns the emotion change data 125 (emotion change parameters) (Step S115). Specifically, the amount-of-change learner 114 updates the emotion change data 125 as explained below and learns the updated emotion change data 125. If the X value of the emotion data 124 has been set to the maximum value in the emotion map 300 in Step S111 even just once on the present day, the DXP of the emotion change data 125 is incremented by one. If the Y value of the emotion data 124 has been set to the maximum value in the emotion map 300 even just once, the DYP of the emotion change data 125 is incremented by one. If the X value of the emotion data 124 has been set to the minimum value in the emotion map 300 even just once, the DXM of the emotion change data 125 is incremented by one. If the Y value of the emotion data 124 has been set to the minimum value in the emotion map 300 even just once, the DYM of the emotion change data 125 is incremented by one. It should be noted that each value of the emotion change data 125 has an upper limit of 20, for example, because an excessively large value of the emotion change data 125 would result in an excessively large amount of each change in the emotion data 124. Each value of the emotion change data 125 is incremented by one in this example, but may also be incremented by two or more if the counted number of times of setting to the maximum or minimum value exceeds a threshold number, for example.

In Step S115 of learning the emotion change data 125 (emotion change parameters), whether the emotion data 124 is set to the maximum or minimum value in the emotion map 300 in Step S111 is determined depending on the external stimulation acquired in Step S101. Since mutually different types of external stimulations are acquired from the sensors included in the sensor unit 210 in Step S101, each piece of the emotion change data 125 is learned in response to each of the external stimulations. For example, repetitive tapping on only the head 204 leads to an increase in only the DXP of the emotion change data 125 and no change in the other values of the emotion change data 125, thereby making the robot 250 a character of readily getting relaxed. In contrast, repetitive slapping on only the head 204 leads to an increase in only the DXM of the emotion change data 125 and no change in the other values of the emotion change data 125, thereby making the robot 250 a character of readily getting nervous. The amount-of-change learner 114 thus learns the emotion change data 125 independently and differently of each other depending on each of the external stimulations.

The control unit 110 then expands the emotion map 300 by increasing the maximum values by two and decreasing the minimum values by two (Step S116), increments the days-of-growth data 126 by one, and returns to Step S101. Although the maximum and minimum values in the emotion map 300 are shifted by two in this example, this amount of shift is a mere example. The amount of shift may be one or three or more other than two. The amounts of shift may be different between the individual axes of the emotion map 300 and between the maximum and minimum values.

Although the learning of the emotion change parameters and the expansion of the emotion map are executed after determination of date change in Step S113 in FIG. 19, these steps may also be executed after determination of arrival at a reference time (for example, 21 o'clock). Alternatively, the determination in Step S113 may be based on the accumulated power-on time of the robot 250 counted using the timer function of the control unit 110, instead of based on the actual date. For example, the robot 250 may be deemed to get growth of a single day every time when the accumulated power-on time reaches a multiple of 24, accompanied with the learning of the emotion change parameters and the expansion of the emotion map.

The steps other than Steps S111 to S116 are identical to those according to Embodiment 1 and therefore will not be redundantly explained.

The above-explained robot controlling process enables the robot 250 to represent various animalistic behaviors and express simulated emotions, despite of its simple structure.

(Modification)

The above-described embodiments should not be construed as limiting the disclosure and may receive various modifications and applications. For example, according to the above-described embodiments, the behaviors of the robot 200 or 250 are achieved by driving the drive unit 220 in accordance with the behavior control data defined in the behavior table 122 and causing the output unit 230 to emit a sound in accordance with the sound data defined in the sound table 123. Alternatively, the behaviors may be achieved only one of the driving of the drive unit 220 and the emission of a sound from the output unit 230. Alternatively, the configuration may use another control of an operation other than the behavior and sound. An exemplary control of an operation other than the behavior and sound includes the control of the color and brightness of an LED for emitting light included in the output unit 230 of the robot 200 or 250.

Although the behaviors of the robot 200 or 250 are achieved using two actuators (motors), that is, the roll motor 221 and the pitch motor 222 according to the above-described embodiments, these two motors may be replaced with other actuators. For example, the behaviors of the robot 200 or 250 may be achieved by a single motor, of which the turning mode is switched by the clutch between the turning about the first rotational axis and the turning about the second rotational axis. The actuator should not necessarily be a rotary motor. For example, the actuator may perform linear reciprocation, which is converted into rotary movement by a component, such as a crank or ball screw.

The behavior table 122 defines various behaviors as illustrated in FIGS. 10 to 14 according to the above-described embodiments. The robot 200 or 250, however, is not necessarily capable of all of these behaviors and is only required to execute at least one of the behaviors.

According to the above-described embodiments, the operational programs executed by the CPU of the control unit 110 are stored in the ROM and the like of the storage unit 120 in advance. This configuration, however, should not be construed as limiting the disclosure. The operational programs for execution of the above-explained various processes may also be installed in an existing general purpose computer or the like, so that the device corresponds to the control unit 110 and the storage unit 120 of the robot 200 or 250 according to the above-described embodiments.

These programs may be provided by any procedure. For example, the programs may be stored for distribution in a non-transitory computer-readable recording medium, such as a flexible disk, a compact disc read-only memory (CD-ROM), a digital versatile disc read-only memory (DVD-ROM), a magneto-optical (MO) disc, a memory card, or a USB memory. Alternatively, the programs may be stored in a storage on a network, such as the Internet, and may be downloaded into a computer.

If the above-explained processes are shared by an operating system (OS) and an application program or achieved by cooperation between the OS and the application program, only the application program may be stored in a non-transitory recording medium or a storage. Alternatively, the program may be superimposed on a carrier wave and distributed via a network. For example, the program may be posted on a bulletin board system (BBS) on a network and thus delivered via the network. In this case, the program may be configured to be able to execute the above-explained processes when activated and executed under the control of the OS as well as other application programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A robot comprising:
  a body contactable with a placement surface;
  a head coupled to a front end of the body so as to be rotatable about a first rotational axis extending in a front-rear direction of the body and rotatable about a second rotational axis extending in a width direction of the body, the head being contactable with the placement surface;
  at least one actuator configured to turn the head by causing the head to make a turn about the first rotational axis and a turn about the second rotational axis independently of each other; and at least one processor configured to control the body to turn right or left about a vertical axis extending vertically from the body by repeating a first turn control scheme and a second turn control scheme in sequence, the first turn control scheme involving driving the actuator to cause the head to make a turn about the first rotational axis in a state in which the head is in contact with the placement surface, and the second turn control scheme involving driving the actuator to cause the head to leave the placement surface and return to an original rotational angle before making the turn in the first turn control scheme.

2. The robot according to claim 1, wherein:

the at least one processor is configured to execute at least one of a first control scheme, a second control scheme, a third control scheme, a fourth control scheme, a fifth control scheme, or a sixth control scheme, the first control scheme involves driving the actuator to cause the head to alternately repeat normal and reverse turns about the first rotational axis in a state in which the head is positioned about the second rotational axis at a first initial angle or a second initial angle, such that a rotational angle of the head about the first rotational axis is controlled within a first angle range, and a rotational angular velocity of the head is controlled to a first angular velocity, the second control scheme involves driving the actuator to cause the head to alternately repeat normal and reverse turns about the first rotational axis in a state in which the head is positioned about the second rotational axis at a third initial angle, such that the rotational angle of the head about the first rotational axis is controlled within a second angle range narrower than the first angle range, and the rotational angular velocity of the head is controlled to a second angular velocity higher than the first angular velocity, the third control scheme involves driving the actuator to cause the head to alternately repeat normal and reverse turns about the second rotational axis in a state in which the head is positioned about the first rotational axis at a reference roll angle, such that the rotational angle of the head about the second rotational axis is controlled within a third angle range narrower than the first angle range and located below a reference pitch angle, and the rotational angular velocity of the head is controlled to a third angular velocity lower than the first angular velocity, the fourth control scheme involves driving the actuator to cause the head to alternately repeat normal and reverse turns about the first rotational axis in a state in which the head is positioned about the second rotational axis at a fourth initial angle, such that the rotational angle of the head about the first rotational axis is controlled within the first angle range, and the rotational angular velocity of the head is controlled to a fourth angular velocity lower than the first angular velocity, the fifth control scheme involves driving the actuator to cause the head to alternately repeat normal and reverse turns about the second rotational axis in a state in which the head is positioned about the first rotational axis at the reference roll angle, such that (i) the rotational angle of the head about the second rotational axis is controlled within any of a fifth angle range narrower than the first angle range and located below the reference pitch angle, a sixth angle range narrower than the first angle range and ranging from an angle below the reference pitch angle to the reference pitch angle, and a seventh angle range narrower than the first angle range and ranging from an angle above the reference pitch angle to the reference pitch angle, and (ii) the rotational angular velocity of the head is controlled to any of a fifth angular velocity lower than the fourth angular velocity, a sixth angular velocity lower than the fourth angular velocity and higher than the fifth angular velocity, and a seventh angular velocity lower than the fifth angular velocity, and the sixth control scheme involves driving the actuator to position the head about the second rotational axis at a fifth initial angle, and then cause the head to alternately repeat normal and reverse turns about the first rotational axis and alternately repeat normal and reverse turns about the second rotational axis, such that the rotational angle of the head about the first rotational axis is controlled within the second angle range, the rotational angular velocity of the head about the first rotational axis is controlled to the second angular velocity, the rotational angle of the head about the second rotational axis is controlled within an eighth angle range narrower than the first angle range and located above the reference pitch angle, and the rotational angular velocity of the head about the second rotational axis is controlled to an eighth angular velocity higher than the first angular velocity.

3. The robot according to claim 2, wherein the at least one processor is configured to:

drive the actuator under the first control scheme to cause the head to alternately repeat normal and reverse turns about the first rotational axis in a state in which the head is positioned at an angle turned, about the second rotational axis, upward from the reference pitch angle to the first initial angle, such that the rotational angle of the head about the first rotational axis is controlled within the first angle range, and the rotational angular velocity of the head about the first rotational axis is controlled to the first angular velocity, thereby representing a pleased behavior of the robot, drive the actuator under the second control scheme to cause the head to alternately repeat normal and reverse turns about the first rotational axis in a state in which the head is positioned at an angle turned, about the second rotational axis, upward from the reference pitch angle to the third initial angle, such that the rotational angle of the head about the first rotational axis is controlled within the second angle range, and the rotational angular velocity of the head about the first rotational axis is controlled to the second angular velocity, thereby representing an excited behavior of the robot, and drive the actuator under the sixth control scheme to cause the head to alternately repeat normal and reverse turns about the first rotational axis and alternately repeat normal and reverse turns about the second rotational axis from a position at which the head is turned, about the second rotational axis, upward from the reference pitch angle to the fifth initial angle, such that the rotational angle of the head about the first rotational axis is controlled within the second angle range, the rotational angular velocity of the head about the first rotational axis is controlled to the second angular velocity, the rotational angle of the head about the second rotational axis is controlled within the eighth angle range, and the rotational angular velocity of the head about the second rotational axis is controlled to the eighth angular velocity, thereby representing an angry behavior of the robot.

4. The robot according to claim 2, wherein the at least one processor is configured to:
drive the actuator under the first control scheme to cause the head to alternately repeat normal and reverse turns about the first rotational axis in a state in which the head is positioned at an angle turned, about the second rotational axis, downward from the reference pitch angle to the second initial angle, such that the rotational angle of the head about the first rotational axis is controlled within the first angle range, and the rotational angular velocity of the head about the first rotational axis is controlled to the first angular velocity, thereby representing a nervous behavior of the robot,
drive the actuator under the third control scheme to cause the head to alternately repeat normal and reverse turns about the second rotational axis in a state in which the head is positioned at an angle turned, about the first rotational axis, to the reference roll angle, such that the rotational angle of the head about the second rotational axis is controlled within the third angle range, and the rotational angular velocity of the head is controlled to the third angular velocity, thereby representing a sad behavior of the robot, and
drive the actuator under the fourth control scheme cause the head to alternately repeat normal and reverse turns about the first rotational axis in a state in which the head is positioned at an angle turned, about the second rotational axis, downward from the reference pitch angle to the second initial angle, such that the rotational angle of the head about the first rotational axis is controlled within the first angle range, and the rotational angular velocity of the head about the first rotational axis is controlled to the fourth angular velocity, thereby representing a spiritless behavior of the robot.

5. The robot according to claim 2, wherein the at least one processor is configured to:
drive the actuator under the fifth control scheme to cause the head to alternately repeat normal and reverse turns about the second rotational axis in a state in which the head is positioned, about the first rotational axis, at the reference roll angle, such that (i) the rotational angle of the head about the second rotational axis is controlled within the fifth angle range, and the rotational angular velocity of the head is controlled to the fifth angular velocity, thereby representing a respiratory behavior of the robot, (ii) the rotational angle of the head about the second rotational axis is controlled within the sixth angle range, and the rotational angular velocity of the head is controlled to the sixth angular velocity, thereby representing a calm behavior of the robot, and (iii) the rotational angle of the head about the second rotational axis is controlled within the seventh angle range, and the rotational angular velocity of the head is controlled to the seventh angular velocity, thereby representing a relaxed behavior of the robot.

6. The robot according to claim 1, wherein the at least one processor is configured to:
acquire an external stimulation,
determine a reaction associated with the acquired external stimulation,
learn emotion change parameters for changing a simulated emotion of the robot in accordance with the acquired external stimulation,
set emotion parameters indicating the simulated emotion of the robot in accordance with the acquired external stimulation and the learned emotion change parameters,
acquire behavior control data for driving the actuator in accordance with the determined reaction and the set emotion parameters, and
drive the actuator to turn the head based on the acquired behavior control data.

7. The robot according to claim 6, wherein the at least one processor is configured to increase or decrease a rotational velocity of the head during driving of the actuator based on the acquired behavior control data.

8. The robot according to claim 6, wherein the at least one processor is configured to temporarily stop turning of the head during driving of the actuator based on the acquired behavior control data.

9. The robot according to claim 8, wherein the at least one processor is configured to temporarily stop turning of the head in a period shorter than a period defined by an inverse of a rotational velocity of the head.

\* \* \* \* \*